United States Patent
Huang et al.

(10) Patent No.: US 11,811,890 B2
(45) Date of Patent: Nov. 7, 2023

(54) PUSHING CONTENT IN TIME WINDOWS BASED ON DIFFERENT POSITIONS

(71) Applicant: HULU, LLC, Santa Monica, CA (US)

(72) Inventors: Shenglan Huang, Beijing (CN); Lan Xie, Beijing (CN); Wenhao Zhang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 29 days.

(21) Appl. No.: 17/507,196

(22) Filed: Oct. 21, 2021

(65) Prior Publication Data

US 2022/0046103 A1    Feb. 10, 2022

Related U.S. Application Data

(63) Continuation of application No. 16/405,400, filed on May 7, 2019, now Pat. No. 11,159,635.

(51) Int. Cl.
| | |
|---|---|
| *H04L 67/55* | (2022.01) |
| *H04L 67/02* | (2022.01) |
| *H04L 65/75* | (2022.01) |
| *H04L 65/613* | (2022.01) |

(52) U.S. Cl.
CPC ............ *H04L 67/55* (2022.05); *H04L 65/613* (2022.05); *H04L 65/75* (2022.05); *H04L 67/02* (2013.01)

(58) Field of Classification Search
CPC ........ H04L 67/55; H04L 65/75; H04L 65/613
See application file for complete search history.

(56) References Cited

U.S. PATENT DOCUMENTS

| | | |
|---|---|---|
| 2011/0149753 A1 | 6/2011 | Bapst et al. |
| 2012/0209961 A1 | 8/2012 | McCoy et al. |
| 2015/0312304 A1 | 10/2015 | Landais et al. |
| 2016/0198012 A1* | 7/2016 | Fablet .................... H04L 67/55 709/231 |
| 2016/0381157 A1 | 12/2016 | Magnusson et al. |
| 2017/0230442 A1 | 8/2017 | Denoual et al. |

(Continued)

FOREIGN PATENT DOCUMENTS

| | | |
|---|---|---|
| EP | 3967047 A1 | 3/2022 |
| WO | 2020227328 A1 | 11/2020 |

OTHER PUBLICATIONS

EP Application Serial No. 20802199.8, EESR dated Jul. 12, 2210 pgs.

(Continued)

*Primary Examiner* — Viet D Vu
(74) *Attorney, Agent, or Firm* — Kwan & Olynick LLP

(57) ABSTRACT

In some embodiments, a method receives a first request for a first time window and a first position. A first message is sent to indicate a computing device will push content to a client in a stream for a video for a first one or more time windows other than the first time window. The method pushes content for the first time window based on the first position. A second request is received to change from the first position to a second position. The method pushes content for a second time window to the client based on the first position. A second message is sent to indicate the computing device will push content to the client in the stream for a second one or more time windows other than the second time window. The method pushes content for a third time window to the client based on the second position.

20 Claims, 7 Drawing Sheets

(56) References Cited

U.S. PATENT DOCUMENTS

| | | |
|---|---|---|
| 2017/0230725 A1 | 8/2017 | Hundemer |
| 2018/0241796 A1 | 8/2018 | Srinivasan et al. |
| 2018/0359410 A1 | 12/2018 | Ain-Kedem et al. |
| 2019/0273808 A1* | 9/2019 | Goel .................. H04L 67/55 |
| 2020/0358866 A1 | 11/2020 | Huang et al. |
| 2021/0067840 A1* | 3/2021 | Mate .................. A63F 13/65 |

OTHER PUBLICATIONS

International Preliminary Report on Patentability and Written Opinion, PCT/US2020/031532, filing date May 5, 2020, dated Nov. 2, 2021. 9 pages.

Hypertext Transfer Protocol Version 2 (HTTP/2); ISSN: 2070-1721; May 2015; URL: https://tools.ietf.org/html/rfc7540, 96 pages.

International Search Report and Written Opinion, PCT/US2020/031532, dated Jul. 31, 2020, 11 pages.

Van Der Hooft et al. NOMS 2016—2016 IEEE/IFIP Network Operations and Management Symposium. "An HTTP/2 Push-Based Approach for SVC Adaptive Streaming". Apr. 29, 2016,(Apr. 29, 2016). [retrieved on Jul. 1, 2020]. Retrieved from the Internet: <URL: https://ieeexplore.ieee.org/document/7502802>, 8 pages.

Wei et al. 2014 IEEE 16th International Workshop on Multimedia Signal Processing (MMSP). "Cost Effective Video Streaming Using Server Push Over HTTP 2.0". Sep. 24, 2014 (Sep. 24, 2014). [retrieved on Jul. 1, 2020]. Retrieved from the Internet: <URL:https://ieeexplore.ieee.org/document/6958796> entire document, 1 page.

\* cited by examiner

PUSHING CONTENT IN TIME WINDOWS BASED ON DIFFERENT POSITIONS

CROSS REFERENCE TO RELATED APPLICATIONS

This application is a continuation application and, pursuant to 35 U.S.C. § 120, is entitled to and claims the benefit of earlier filed application U.S. application Ser. No. 16/405,400 filed May 7, 2019, the content of which is incorporated herein by reference in its entirety for all purposes.

BACKGROUND

Hypertext transfer protocol (HTTP)/2 is an HTTP network protocol that replaced HTTP/1.1. Using HTTP/2 over HTTP/1.1 to stream video results in a decrease in latency and improves the loading speed of video in video streaming applications. HTTP/2 includes a feature called "server push". When using the feature, a server push module allows a server to push content to a client. That is, the content that is pushed to the client may include more data than the client has currently requested. This allows the server to supply content it thinks a client may need in the future without waiting for the client to examine a prior response from the server and without the overhead of the client sending a request for the content. Using the server push feature requires the feature to be established for a stream between the client and the server. Additionally, any changes to the push session requires that the stream be terminated and a new stream be established to reflect the changes. The constant termination and establishment of streams may result in a degraded user experience because of the time taken to terminate existing streams and establish new streams.

DETAILED DESCRIPTION

Described herein are techniques for a video delivery system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments provide a feature in a server push process that is referred to as a soft server push with a soft switch. When applying the server push process in video streaming, a request for content may be changed frequently during the push process. For example, in video streaming, a protocol, such as Dynamic Adaptive Streaming over HTTP (DASH) or HTTP Live Streaming (HLS), transmits video by breaking the overall video stream into a sequence of small files and the client downloads each small file using HTTP transactions. The DASH or HLS protocol allows a client to change bitrates when environmental conditions dictate, such as a client may request higher bitrate segments when more bandwidth is available and lower bitrate segments when less bandwidth is available. Additionally, in 360 degree video (e.g., in virtual reality or augmented reality video), a user may change the viewport position (e.g., where a user is looking in the 360 degree environment). The above changes may result in changing characteristics of the push session. If a conventional hard push termination is used, the benefits of the server push process may be lost as the time to re-initialize a new push process may affect the performance of the video and the number of changes in either bitrate or viewport position may cause a large number of cancellations and re-initializations. However, the soft server push process allows the server to update a current push process (e.g., a soft switch) when a change occurs without terminating the current push session. The server can then continue to push content without receiving a request to start a new push session.

System

Figure 1:
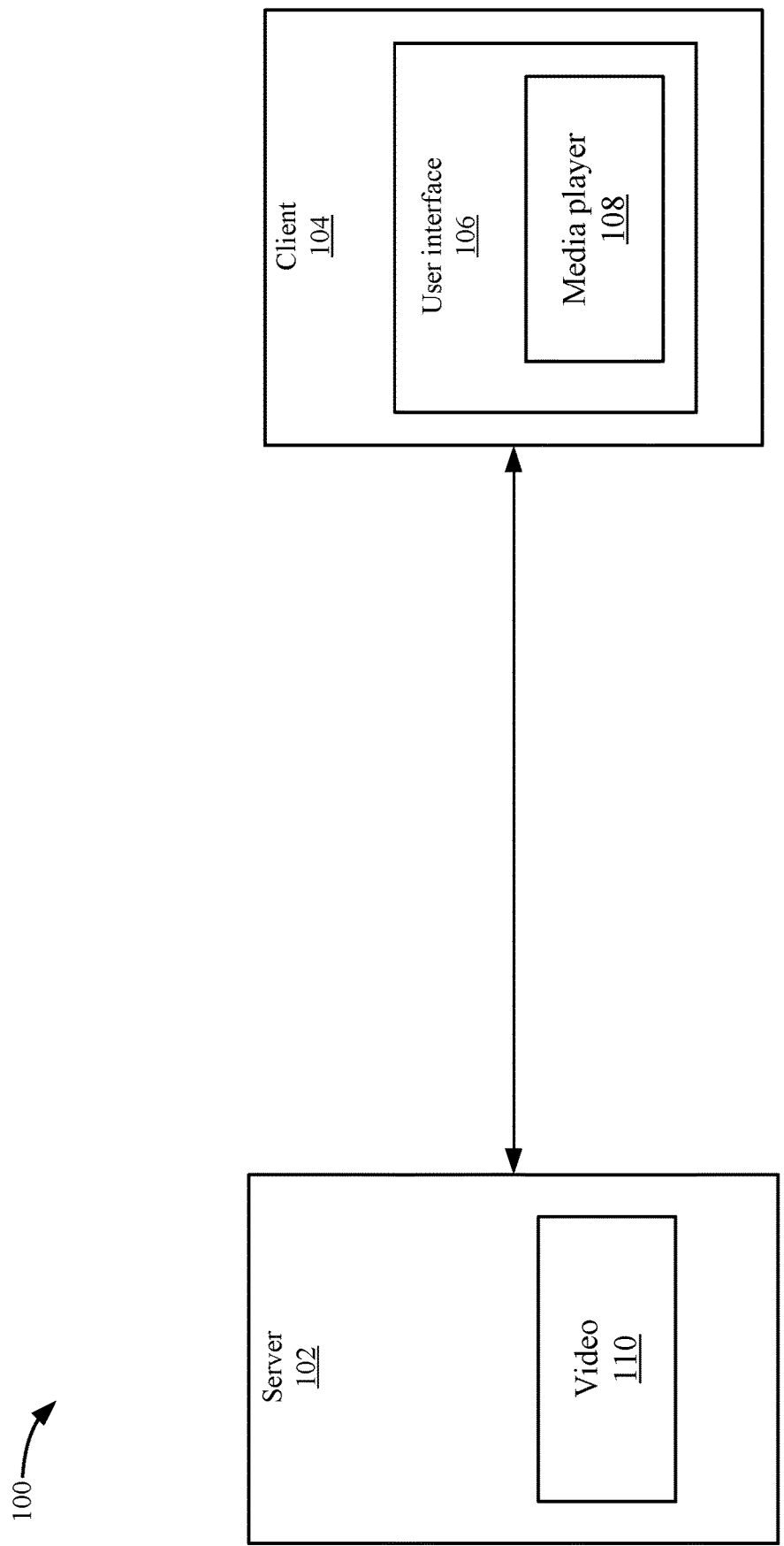
FIG. 1 depicts a simplified system for performing a soft server push process according to some embodiments.

FIG. 1 depicts a simplified system 100 for performing a soft server push process according to some embodiments. System 100 includes a server 102 and client 104. Although one instance of server 102 and client 104 are described, multiple clients 104 may be communicating with multiple servers 102. In some embodiments, client 104 is requesting content from server 102. For example, server 102 may be streaming video to client 104. Although a video will be described, other types of content can be used with the soft server push process.

Client 104 may include a user interface 106 that instantiates a media player 108 to play a video 110. Media player 108 may request segments of video 110 from server 102. Server 102 may be storing video 110 that is streamed to client 104. In other embodiments, server 102 may receive segments of video 110 from another server and provide those segments to client 104 upon request. Although one video is shown, video 110 may include multiple versions of the video in different bitrates or video 110 may be 360 degree video. Client 104 may use a protocol, such as DASH or HLS, to request segments of video 110 at different bitrates. Server 102 sends the segments using an HTTP protocol, such as HTTP/2. Although DASH, HLS, and HTTP/2 are described, other protocols may be used to implement the soft server push process described herein. Also, client 104 may be part of a virtual reality or augmented reality system. Client 104 can request different viewport positions, which are locations where a user may be focused on in a 360 degree environment. Server 102 may deliver video at different quality levels based on the viewport position, such as delivery higher quality video to the viewport position and lower quality video outside of the viewport. This provides the higher quality video to where the user is currently looking in the 360 degree environment.

The HTTP protocol is a request-and-response protocol. In some cases, a single connection between client 104 and server 102 may be established, such as between client 104 and an origin server that is storing video 110. However, client 104 may also connect to edge servers, which receive content from other servers, such as the origin server. The protocol, such as HTTP/2, optimizes the request and response protocol from a prior protocol of HTTP/1.1. In HTTP/2, the basic protocol unit is referred to as a frame. The protocol HTTP/2 includes different frame types that serve different purposes when sent between server 102 and client 104. For example, the HEADERS frames and DATA frames support the HTTP request-and-response messages, and other frame types, such as a PUSH_PROMISE frame support other HTTP/2 features. The PUSH_PROMISE frame is used to initialize a push session in HTTP/2.

As discussed above, HTTP/2 allows server 102 to push responses to client 104. Server push allows server 102 to speculatively send content to client 104 that server 102 anticipates client 104 will need. Server push trades off increasing network usage against potential latency gain. For example, it is possible that some content that is pushed may not be needed by client 104, but content that is pushed which is needed by client 104 reduces latency in playback of the content as client 104 receives the content more efficiently and possibly sooner. Server 102 performs the server push process by synthesizing a request, which server 102 sends as a PUSH_PROMISE frame. Server 102 can then send a response to client 104 that includes content that is being pushed to client 104.

Server Push Call Flow

Figure 2:
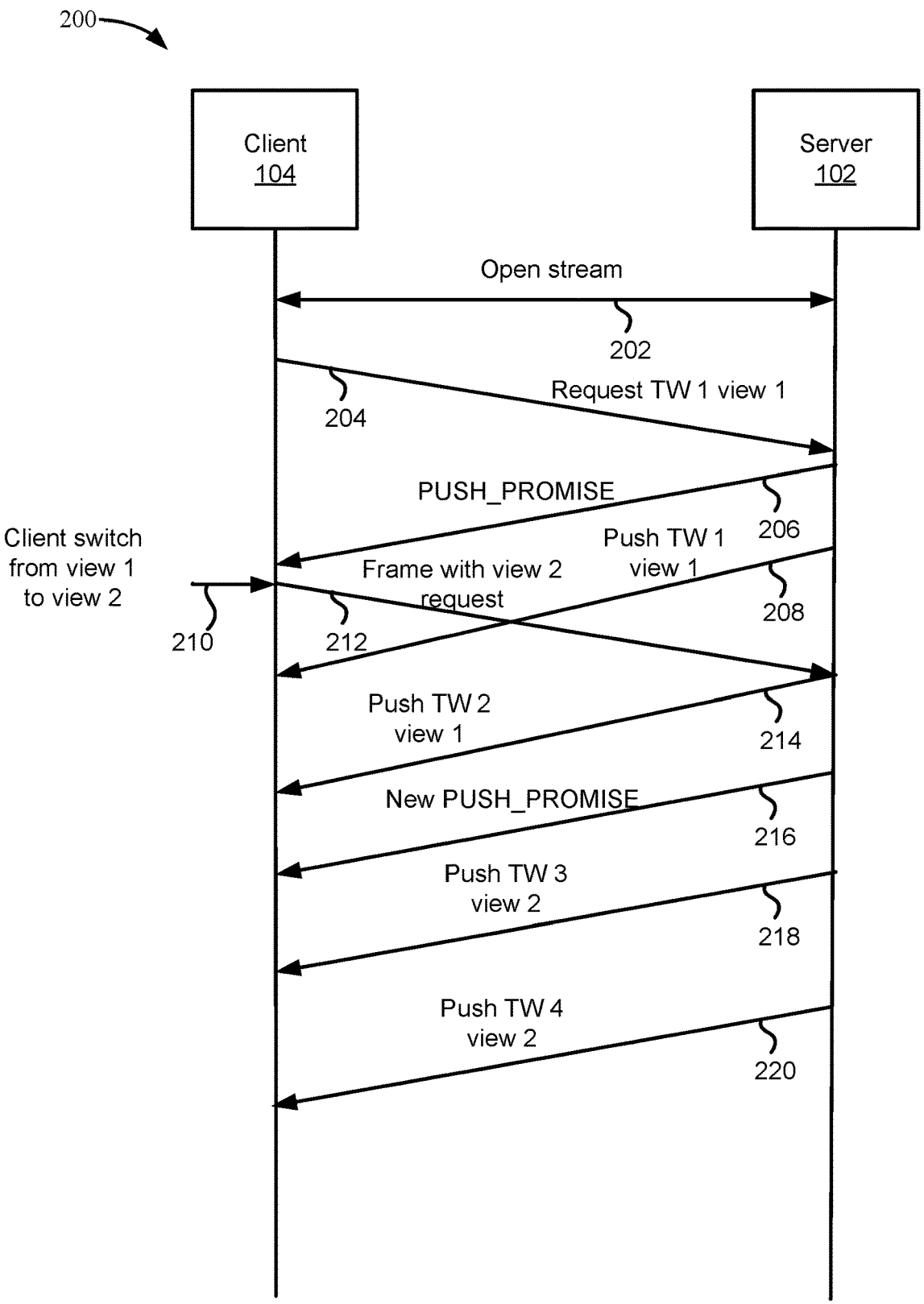
FIG. 2 depicts a call flow between a server and a client that implements the soft server push process according to some embodiments.

FIG. 2 depicts a call flow 200 between server 102 and client 104 that implements the soft server push process according to some embodiments. In call flow 200, client 104 may change the content request during an already initialized push process. The following will describe the soft push process that allows server 102 to adjust to the change and uses a 360 degree video environment as an example, but other types of video streaming may use the soft server push process, such as adaptive bitrate streaming using DASH or HLS.

At 202, client 104 and server 102 open a stream to send video 110. The stream may be a connection that is identified by a stream identifier. Server 102 may send the video on the open stream to client 104. At 204, client 104 sends a request for a time window (TW) 1 view 1. This request is for a time window TW 1 and requests content for a view 1. Time window TW 1 is requesting content for a time period and view 1 may be the position of a viewport in an adaptive 360 degree video. For example, 360 degree video streaming allows a user to watch a video in a 360 degree environment. The user can change the viewport position, such as by moving a headset monitor to different positions in the 360 degree video. When a user switches the position of the viewport, client 104 may request a different viewport position.

Upon receiving the request, at 206, server 102 sends a PUSH_PROMISE message to client 104. The PUSH_PROMISE message indicates that server 102 may send additional content to client 104 without receiving any further requests from client 104. That is, client 104 requested content for a time window TW 1, but server 102 may push content for other time windows without receiving a request for the other time windows.

At 208, server 102 may push content referred to as TW 1 view 1, which is content from a view 1 in a time window TW 1. At 210, client 104 may switch a characteristic of the content request, such as changing from a view 1 to a view 2. In this example, a user may have switched the viewport position of the headset. At 212, client 104 sends a frame indicating the change to view 2 to server 102.

Before receiving the request for view 2, server 102 may begin to prepare additional content for a time window TW 2 view 1. This is additional content for video 110 with the viewport position set to view 1 even though the user may have switched to viewport position view 2. Then, server 102 receives the frame with request for view 2 with a flag set to perform a soft switch. In the soft switch, instead of cancelling the push of the content, at 214, server 102 may send content for a time window TW 2 view 1. The additional push of the content for time window TW 2 view 1 may not be for the viewport position view 2; however, sending the content may avoid some choppiness in displaying the video while possibly displaying some lower quality content in view 2 because the higher quality content is sent for view 1.

At 216, server 102 may send a new PUSH_PROMISE frame to client 104 in response to receiving the frame with the request for view 2. In this example, the stream that was opened at 202 to send the content from the view 1 may be still used because the push process has not been canceled. The ability to use the existing stream is provided by using a soft switch, which will be described in more detail below. Then, at 218, server 102 pushes content from a time window TW 3 and view 2. This content may send high quality video from a new viewport position view 2 and low quality video for positions outside of the viewport position of view 2. Continuing the process, at 220, server 102 may push content from a time window TW 4 and view 2.

Figure 3:
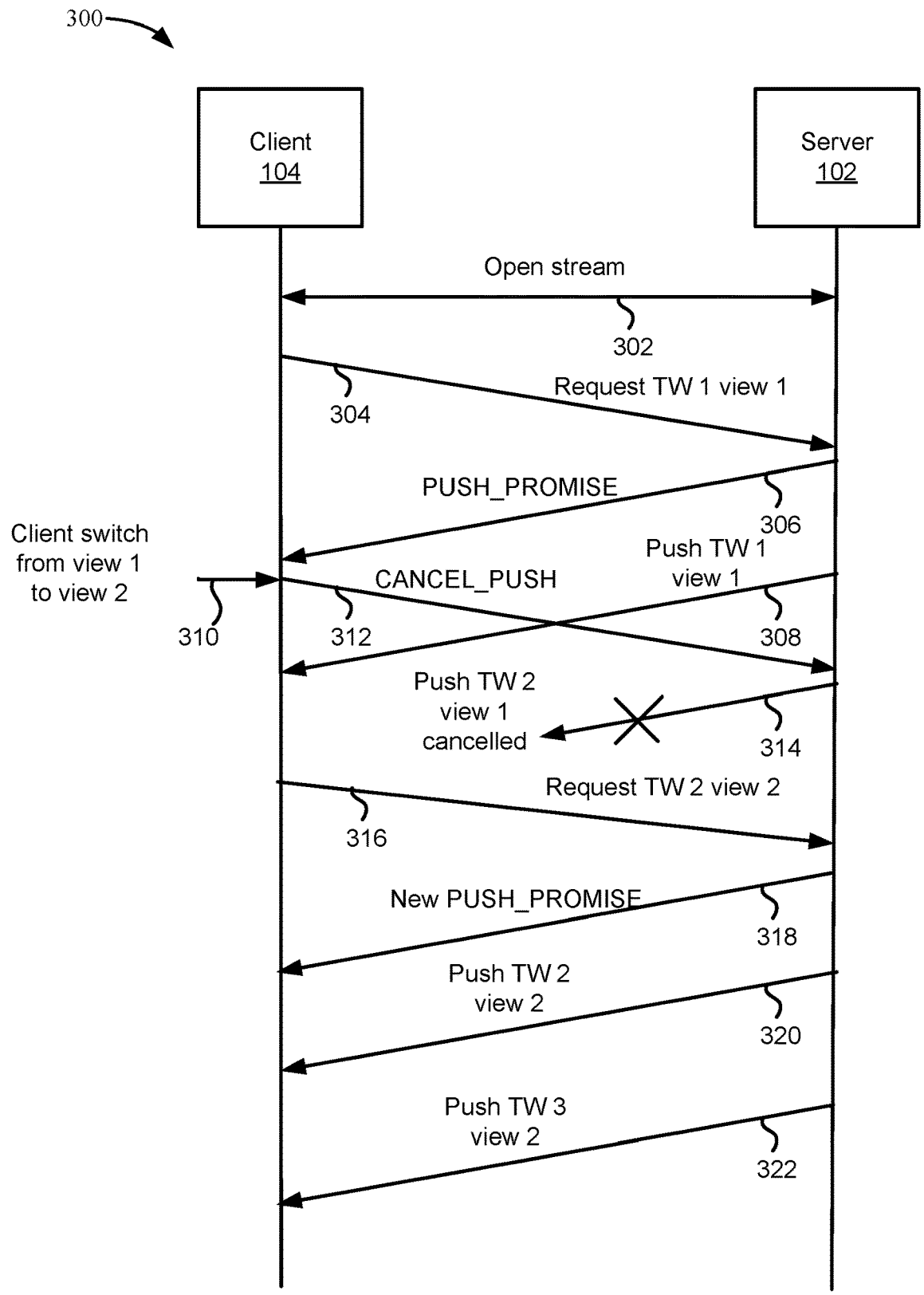
FIG. 3 depicts a conventional call flow that does not use the soft push process.

In the above process, the cancellation of the push process is not performed and additionally, the pushing of content from a previous view is not cancelled. The use of the same stream to push content from view 1 and view 2 may more efficiently perform the switch from the viewport position view 1 to the viewport position of view 2. This is because an existing stream does not need to be terminated and a new stream does not need to be opened. Additional round-trip requests and responses are not needed to terminate and open a new stream to change from pushing content from viewport position view 1 to pushing content from viewport position view 2. An example of the additional requests and responses are illustrated in FIG. 3. FIG. 3 depicts a conventional call flow that does not use the soft push process according to some embodiments. At 302, server 102 and client 104 open a stream. At 304, client 104 requests content from a time window TW 1 at a viewport position of view 1. At 306, server 102 sends a PUSH_PROMISE frame to client 104. Then, at 308, server 102 pushes content for a time window TW 1 at a viewport position of view 1. At 310, client 104 switches from view 1 to view 2. Then, at 312, client 104 sends a CANCEL_PUSH frame to server 102 to cancel the server push session. Upon receiving the CANCEL_PUSH frame, at 314, server 102 cancels the push of content for the viewport position of view 1, such as canceling the push of content for time window TW 2 at a viewport position of view 1. Accordingly, unlike the process described in FIG. 2, server 102 does not send additional content for a time window TW 1 at a viewport position view 1. This may result in choppiness in the video during the cancellation and reinitialize phases.

At 316, client 104 may send a request content for a time window TW 2 at a viewport position view 2 to server 102. This opens up a new stream for viewport position view 2 in the time window TW 2. Once receiving this request, at 318, server 102 sends a new PUSH_PROMISE frame. At 320, server 102 pushes content for a time window TW 2 at a viewport position view 2. Then, at 322, server 102 pushes additional content for a time window TW 3 for the viewport position view 2.

In the above process, server 102 did not send content from view 1 in time window TW 2. This may result in a choppy video playback experience at client 104 as client 104 may not have content to play until server 102 pushes content for time window TW 2 at viewport position view 2 at 320. Further, additional messaging is required at 316 for client 104 to send a request for content for viewport position view 2. That is, client 104 sent a CANCEL_PUSH frame at 312 and another request for content for viewport position view 2 at 316. In contrast, the soft server push process sends a request for view 2 at 212 in FIG. 2 with a soft switch flag and server 102 can respond by sending a new PUSH_PROMISE upon receiving the frame with the flag to perform a soft switch to change to view 2 at 212. By using the soft server push process, not only does client 104 continue to receive content from view 1, but server 102 can switch to viewport position view 2 faster by sending a new PUSH_PROMISE frame upon receiving the frame with the soft switch flag. Without using the soft server push process, three frames need to be sent to change the client view. This means that when users frequently change the requested view, the user experience may degrade as the downloading of content is delayed due to the messaging between client 104 and server 102 to terminate the push session and establish a new push session to switch views. Although the process is described with changing views, the process is not limited to view changes. Rather, bitrates or other characteristics of sending the video may be changed.

Life Cycle of a Stream

Figure 4:
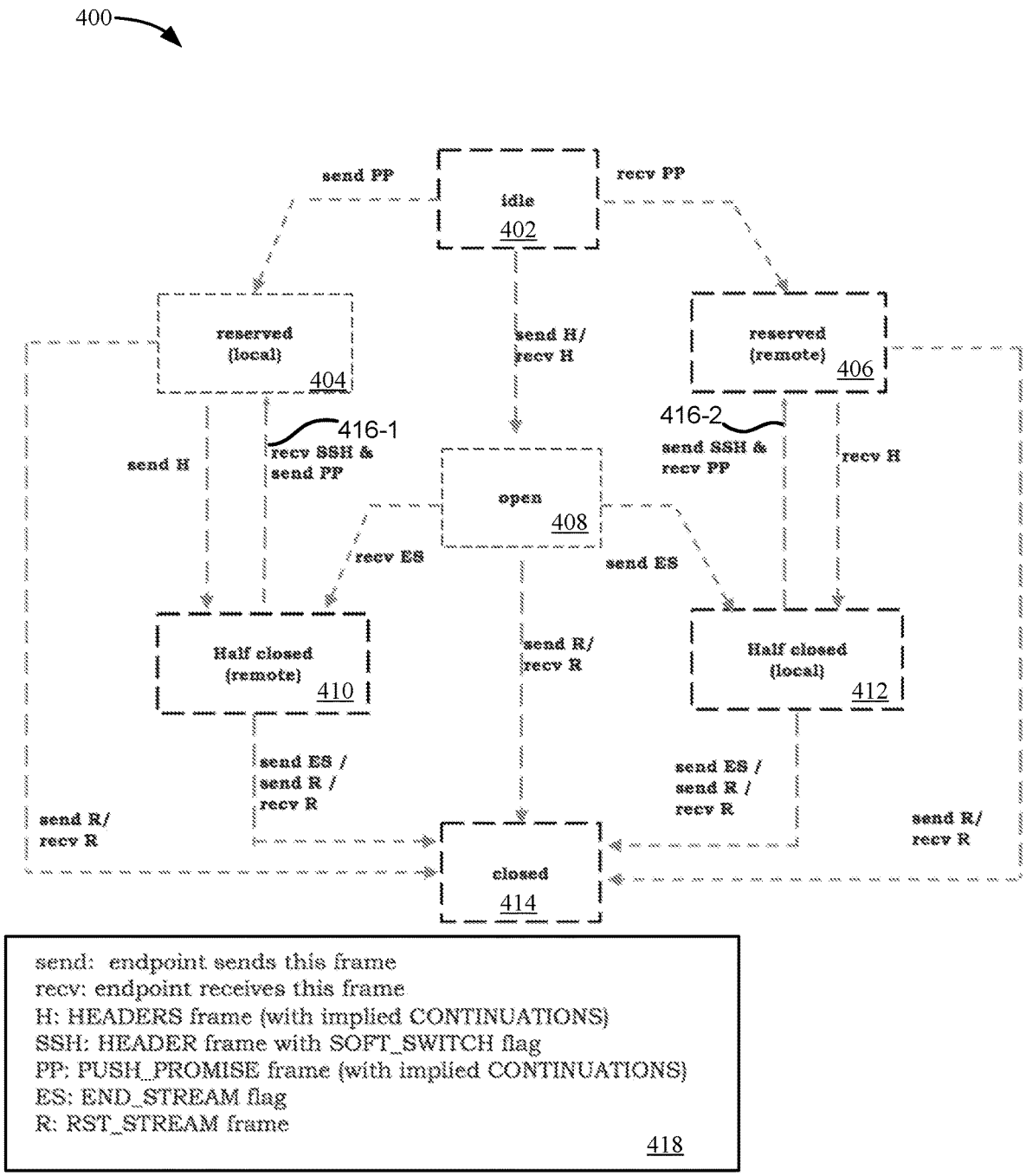
FIG. 4 depicts an example of a life cycle of a stream according to some embodiments.

The efficiency of the soft server push process is based on the life cycle of a stream. Accordingly, a life cycle of the stream for the soft server push process will be described using different stream states. FIG. 4 depicts an example 400 of a life cycle of a stream according to some embodiments. A key 418 describes abbreviations used in the figure. At 402, client 104 and server 102 may be in an idle state in which all streams start. In the idle state, server 102 and client 104 are not sending and receiving content, respectively, in a stream. When server 102 sends or client 104 receives a HEADERS frame, the stream becomes "open" at 408. A stream that is in the open state may be used by client 104 or server 102 to send frames of any type. In this example, server 102 may send a HEADERS frame and client 104 receives the HEADERS frame.

Sending a PUSH_PROMISE frame on a stream other than the stream to send content reserves the idle stream that has been identified for later use. The stream state for the stream when it is reserved transitions to a "Reserved (local)" state at 404 at server 102. When client 104 receives a PUSH_PROMISE frame on the idle stream, client 104 reserves the idle stream and the stream state transitions to a "Reserved (remote)" state at 406. Server 102 does not send the PUSH_PROMISE frame on the idle stream but references the idle stream by an identifier, such as in a promise stream identifier (ID) field in the PUSH_PROMISE frame. Receiving any frame other than the HEADERS frame or a PRIORITY frame on the stream in the idle state may be treated as a connection error of a type PROTOCOL_ERROR, which is why server 102 sends the PUSH_PROMISE frame on another stream.

A stream in the Reserved (local) state is one that has been promised by sending the PUSH_PROMISE frame. The PUSH_PROMISE frame reserves the idle stream by associating the stream with an open stream that was initiated by client 104. Server 102 can send a HEADERS frame that causes the stream to open in a "Half-closed (remote)" state. A stream in the Reserved (remote) state has been reserved by server 102 at client 104. Receiving a HEADERS frame from server 102 causes client 104 to transfer the stream to "Half-closed (local)" state at 412.

At 412, a stream that is in the half-closed (local) state cannot be used for sending frames other than a WINDOW_UPDATE, PRIORITY, and RST_STREAM frames. The WINDOW_UPDATE frame is used for flow control and represents the max size of content that can be sent in the window. The PRIORITY frame is used to describe the prioritization when client 104 or server 102 is to allocate resources when managing multiple streams. The RST_STREAM frame is used to immediately terminate a stream. At 410, a stream that is in the half-closed (remote) state is no longer being used by client 104 to send frames. If server 102 receives additional frames other than the WINDOW_UPDATE, PRIORITY, or RST_STREAM when in this state, server 102 responds with a stream error of the type STREAM_CLOSED. Server 102 may use a stream that is in the half-closed (remote) state to send frames of any type. In this state, server 102 continues to observe advertised stream level flow control limits. The stream can transition from the half-closed (remote) to a "closed" state at 414 by sending a frame that contains an END_STREAM flag, or when either client 104 sends an RST_STREAM frame or server 102 sends an RST_STREAM frame.

In the half-closed (local) state, client 104 can transition the stream to the closed state when a frame that contains an END_STREAM flag is received from server 102 or when client 104 or server 102 sends an RST_STREAM frame. The RST_STREAM frame releases the stream reservation and closes the stream. When in the open state, the stream may be closed similarly when an RST_STREAM frame is sent either by client 104 or server 102.

Conventionally, once reaching the half closed state, there is no transition other than to transition to the closed state. However, the soft server push process adds a transition between the half-closed (remote) and the reserved (local) state and also a transition between a half-closed (local) state to the reserved (remote) state. Some embodiments define information, such as a flag named "SOFT_SWITCH", that can be set in a frame, such as a HEADERS frame. A HEADERS frame with a SOFT_SWITCH flag may be sent by client 104 when a change occurs, such as a change in the viewport or a change in the bitrate.

After server 102 receives the HEADERS frame with the SOFT_SWITCH flag set, server 102 may finish sending the current content being prepared for transmission or currently being transmitted and then send a PUSH_PROMISE frame in the current stream. After sending the new PUSH_PROMISE frame, at 416-1, server 102 transfers the status to the reserved (local) state. Further, upon receiving the new PUSH_PROMISE frame, at 416-2, client 104 transfers the state of the stream from the half-closed (local) state to the reserved (remote) state. Upon transitioning back to the reserved (local) state and reserved (remote) state, server 102 and client 104 can resume the push process with the change that was requested as described in FIG. 2. For example, server 102 can send a HEADERS frame that causes the stream to open in a "Half-closed (remote)" state. A stream in the Reserved (remote) state has been reserved by server 102 at client 104. Receiving a HEADERS frame from server 102 causes client 104 to transfer the stream to "Half-closed (local)" state at 412. Being in the reserved (local) state and the reserved (remote) state allows server 102 to push content in the same stream that was being used. In contrast, conventionally, server 102 and client 104 transition to the closed state, which released the stream reservation. Then, server 102 and client 104 have to reserve another stream. Once the stream is in the closed state, the stream could not be reused. The restart process has to start from the very beginning at the idle state.

Header Structure

Figure 5:
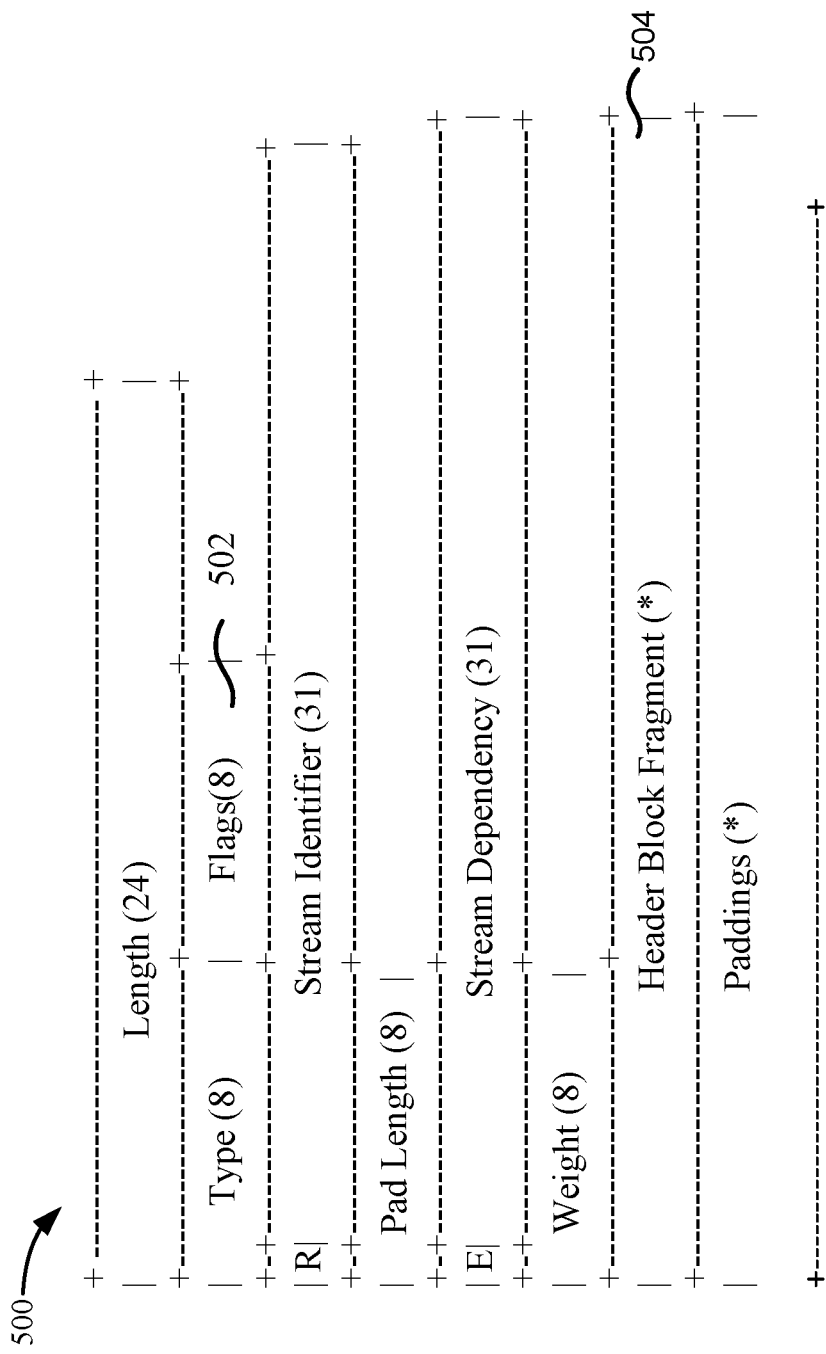
FIG. 5 depicts an example of a header according to some embodiments.

FIG. 5 depicts an example of a header 500 according to some embodiments. Header 500 may include header frame fields. Although this format is shown, other formats may be used.

Header 500 includes a flag for the soft switch process. When the flag is set, such as by sending a flag to a value of "1", this indicates that the frame is requesting a SOFT_SWITCH of the PUSH_PROMISE content. In some embodiments, the SOFT_SWITCH flag may be included in the "Flags(8)" fragment at 502 in header 500. However, the flag may be included in other places in header 500. Additionally, the request content, such as the change to the push request, may also be included in the header block fragment at 504.

Conclusion

Accordingly, the soft push process saves time when a switch of a characteristic of the server push session associated with an existing PUSH_PROMISE frame is changed. For example, the change may include a change to the viewport or a change to the bitrate requested for a video stream. The use of the soft push process allows server 102 to switch to a new PUSH_PROMISE that uses the current reserved stream for the new characteristics. This improves the streaming process between server 102 and client 104 by reducing latency in performing the switch. Further, the soft push process does not cancel an in-process transmission of content, which also improves the display of the video.

System

Figure 6:
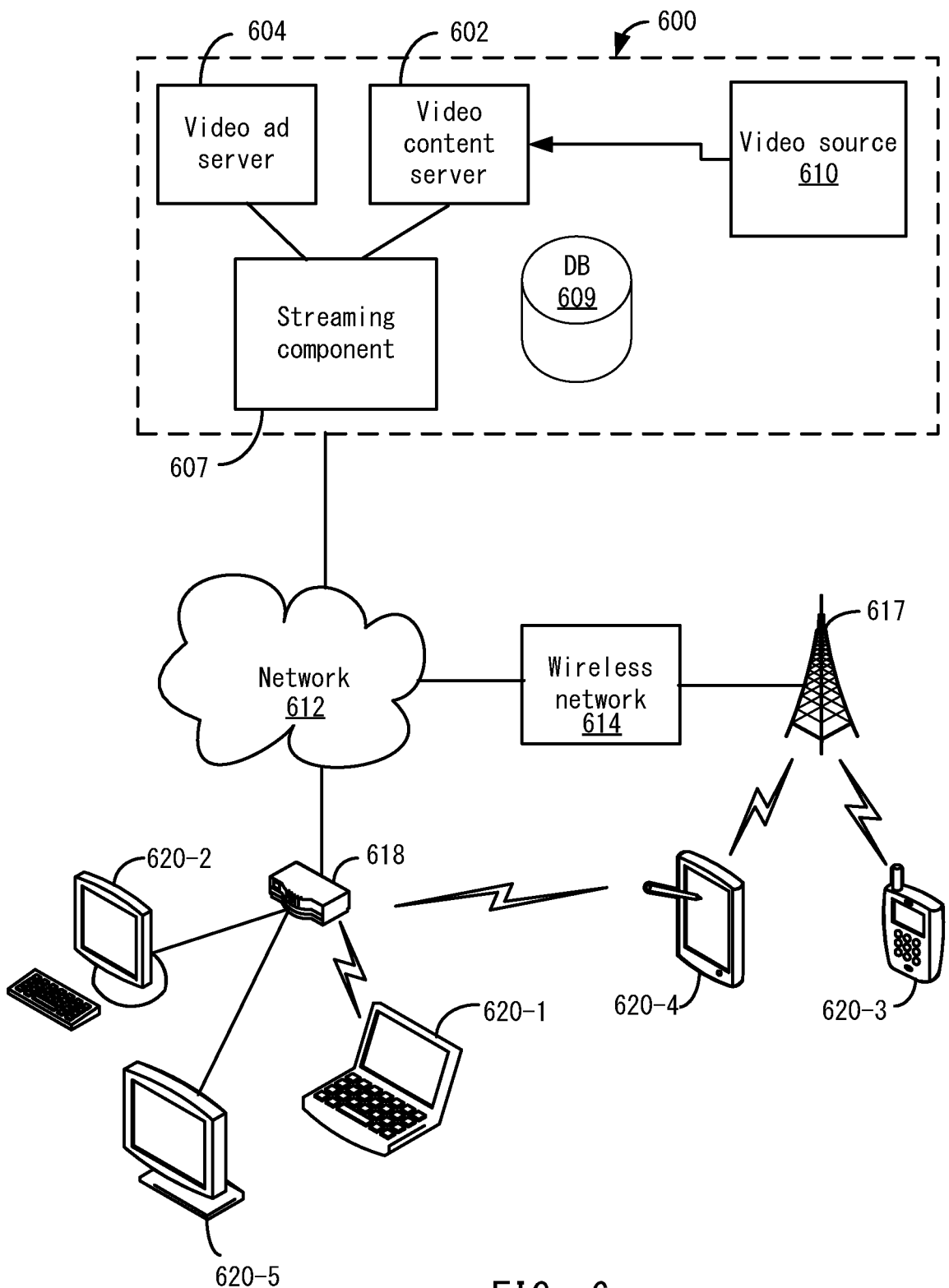
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 600, a public service message, or some other information. The video advertising server 604 may serve the video advertising segments as directed by a user interface controller (not shown).

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example, administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612, wireless cellular telecommunications network 614, and/or another network. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless cellular telecommunications network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HTTP and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
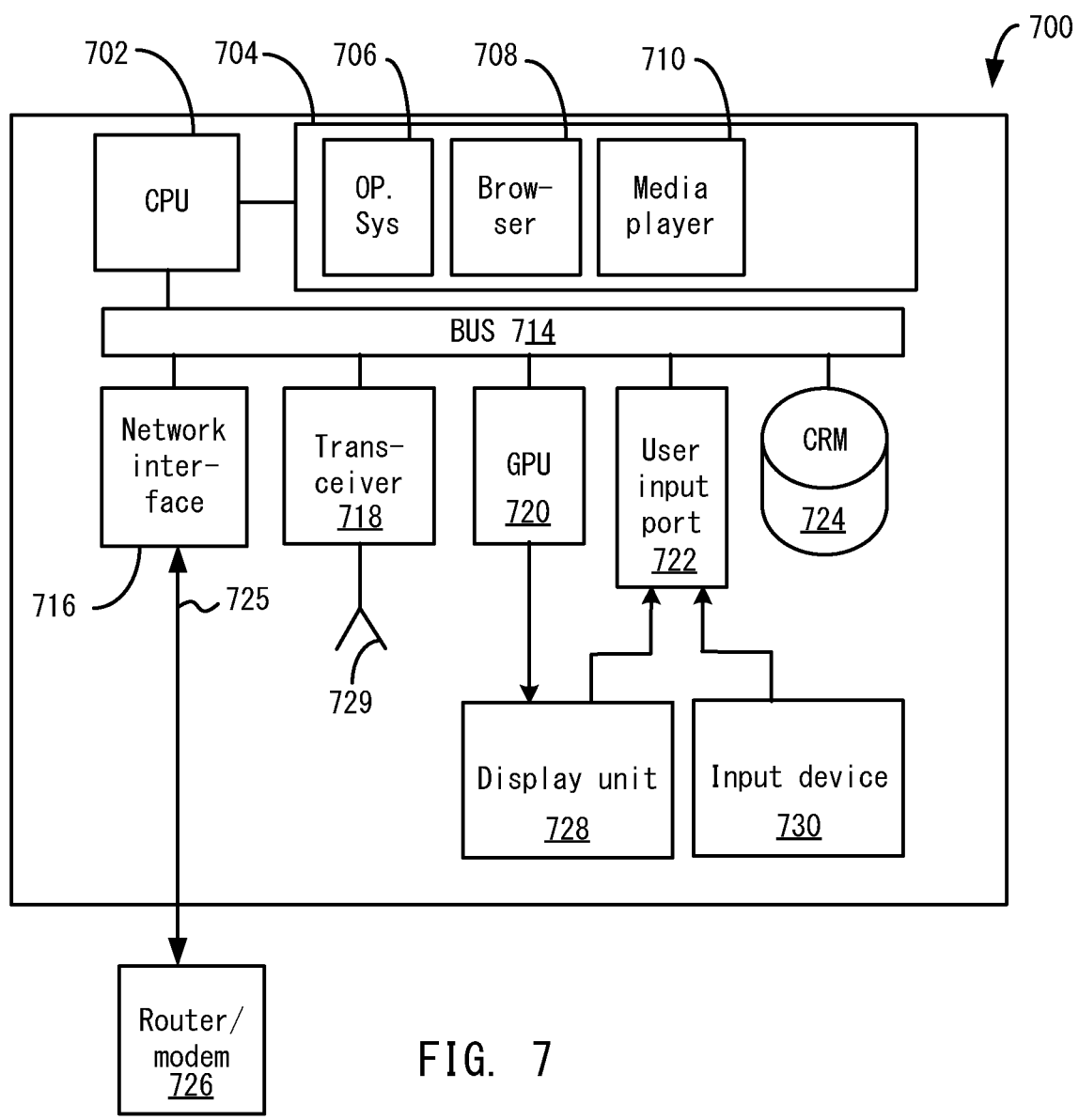
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured or operable to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured or operable to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a first request for a first time window and a first position in a video;
   sending, by the computing device, a first message to indicate the computing device will push content to a client in a stream for the video for a first one or more time windows other than the first time window;
   pushing, by the computing device, content for the first time window to the client based on the first position;
   receiving, by the computing device, a second request to change from the first position to a second position;
   after receiving the second request, pushing, by the computing device, content for a second time window to the client based on the first position;
   after pushing the content for the second time window, sending, by the computing device, a second message to indicate the computing device will push content to the client in the stream for a second one or more time windows other than the second time window; and
   pushing, by the computing device, content for a third time window to the client based on the second position.

2. The method of claim 1, wherein the second request includes information that indicates the pushing of content for the stream is to continue using the second position.

3. The method of claim 2, wherein the pushing of content for the second time window based on the first position is performed before sending the second message and after receiving the second request.

4. The method of claim 1, wherein pushing content for the second time window comprises:
   before receiving the second request, preparing content for the second time window based on the first position; and
   after receiving the second request, sending the content that was prepared for the second time window based on the first position.

5. The method of claim 4, further comprising:
   after finishing sending the content that was prepared for the second time window based on the first position, sending the second message.

6. The method of claim 1, wherein pushing content for the second time window comprises:
   before receiving the second request, sending a first portion of content for the second time window based on the first position; and
   after receiving the second request, sending a second portion of content for the second time window based on the first position.

7. The method of claim 6, further comprising:
   after finishing sending the second portion of content for the second time window based on the first position, sending the second message.

8. The method of claim 1, wherein:
   the first position is a first viewport position of a headset; and
   the second position is a second viewport position of the headset.

9. The method of claim 1, wherein the stream is not closed when a transition occurs from pushing content based on the first position to pushing content based on the second position.

10. The method of claim 1, wherein:
    the first position is a first portion of 360 degree video, and
    the second position is a second portion of the 360 degree video.

11. The method of claim 10, wherein:
    the pushing of the content based on the first position pushes content in the first position using a first characteristic and pushes content outside of the first position using a second characteristic, and
    the pushing of the content based on the second position pushes content in the second position using the first characteristic and pushes content outside of the second position using the second characteristic.

12. The method of claim 1, wherein the content for the second window is sent without receiving a request for content in the second time window.

13. The method of claim 1, further comprising:
preparing the content for the second time window based on the first position before receiving the second message, and
continuing to send of the content that is prepared instead of canceling the sending of the content.

14. The method of claim 1, further comprising:
transitioning to a first state upon sending the first message, wherein the first state reserves the stream; and
transitioning from the first state to a second state upon sending the first message, wherein the second state allows pushing of content to the client.

15. The method of claim 14, further comprising:
transitioning from the second state to the first state upon receiving the second request; and
transitioning from the first state to a second state upon sending the second message.

16. The method of claim 15, wherein transitioning from the second state to the first state upon receiving the second request allows the pushing of the content based on the second position in the stream without closing the stream.

17. A non-transitory computer-readable storage medium containing instructions, that when executed, control a computer system to be operable for:
receiving a first request for a first time window and a first position in a video;
sending a first message to indicate the computing system will push content to a client in a stream for the video for a first one or more time windows other than the first time window;
pushing content for the first time window to the client based on the first position;
receiving a second request to change from the first position to a second position;
after receiving the second request, pushing content for a second time window to the client based on the first position;
after pushing the content for the second time window, sending a second message to indicate the computing system will push content to the client in the stream for a second one or more time windows other than the second time window; and
pushing content for a third time window to the client based on the second position.

18. A method comprising:
sending, by a computing device, a first request for a first time window and a first position in a video;
receiving, by the computing device, a first message to indicate the computing device will push content to a client in a stream for the video for one or more other time windows than the first time window;
receiving, by the computing device, content for the first time window to the client based on the first position;
sending, by the computing device, a second request to change from the first position to a second position;
after sending the second request, receiving, by the computing device, content for a second time window to the client based on the first position;
after receiving the content for the second time window, receiving, by the computing device, a second message to continue pushing content to the client in the stream based on the second position; and
receiving, by the computing device, content for a third time window to the client based on the second position.

19. The method of claim 18, wherein the second request includes information that indicates the pushing of content for the stream is to continue using the second position.

20. The method of claim 18, wherein the content for the second window is received without sending a request for content in the second time window.

* * * * *